(12) United States Patent
Takeda et al.

(10) Patent No.: US 11,178,026 B2
(45) Date of Patent: Nov. 16, 2021

(54) MONITORING SYSTEM, PROCESSING DEVICE, AND MONITORING DEVICE

(71) Applicant: MITSUBISHI HEAVY INDUSTRIES, LTD., Tokyo (JP)

(72) Inventors: Kazuhiro Takeda, Tokyo (JP); Yusuke Yamashina, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 162 days.

(21) Appl. No.: 16/495,291

(22) PCT Filed: Mar. 23, 2018

(86) PCT No.: PCT/JP2018/011836
§ 371 (c)(1),
(2) Date: Sep. 18, 2019

(87) PCT Pub. No.: WO2018/174262
PCT Pub. Date: Sep. 27, 2018

(65) Prior Publication Data
US 2020/0099598 A1    Mar. 26, 2020

(30) Foreign Application Priority Data

Mar. 24, 2017    (JP) .............................. JP2017-059450

(51) Int. Cl.
*G06F 11/00*    (2006.01)
*H04L 12/26*    (2006.01)
(Continued)

(52) U.S. Cl.
CPC ......... *H04L 43/024* (2013.01); *G01M 99/005* (2013.01); *H04L 47/12* (2013.01)

(58) Field of Classification Search
None
See application file for complete search history.

(56) References Cited

U.S. PATENT DOCUMENTS 6,556,956 B1    4/2003    Hunt
10,425,790 B2 *   9/2019    Shinohara ............... H04L 67/12
(Continued)

FOREIGN PATENT DOCUMENTS

JP    H04-37277 A    2/1992
JP    H08-205130 A    8/1996
(Continued)

OTHER PUBLICATIONS

International Search Report dated Apr. 24, 2018, issued in counterpart Application No. PCT/JP2018/011836, with English translation. (4 pages).

(Continued)

*Primary Examiner* — Phyllis A Book
(74) *Attorney, Agent, or Firm* — Westerman, Hattori, Daniels & Adrian, LLP (57) ABSTRACT

A monitoring system performs monitoring using a monitoring device connected to a facility to be monitored through the Internet via communication, wherein the facility is provided with a facility body and a data processing unit configured to process acquired data acquired from the facility body, the data processing unit includes: a low-density data acquisition unit configured to acquire low-density data, a high-density data acquisition unit configured to acquire high-density data having a larger data amount per unit time than the low-density data; a data conversion unit configured to convert the high-density data into feature quantity data which is reduced in density of the high-density data; and a transmission unit configured to transmit monitoring data including the low-density data and the feature quantity data, and the monitoring device configured to perform monitoring on the basis of the monitoring data transmitted from the transmission unit in the data processing unit.

6 Claims, 6 Drawing Sheets

(51) Int. Cl.
  *H04L 12/801* (2013.01)
  *G01M 99/00* (2011.01)

(56) References Cited

U.S. PATENT DOCUMENTS

| | | | |
|---|---|---|---|
| 2005/0114044 A1 | 5/2005 | Hala et al. | |
| 2009/0141593 A1* | 6/2009 | Taha | G01D 7/02 368/10 |
| 2014/0335505 A1* | 11/2014 | Holmes | G16H 10/40 435/5 |
| 2016/0046373 A1* | 2/2016 | Kugelmass | H04L 67/12 701/8 |
| 2016/0098647 A1 | 4/2016 | Nixon et al. | |
| 2016/0261481 A1 | 9/2016 | Ogata et al. | |
| 2018/0137691 A1 | 5/2018 | Satou | |

FOREIGN PATENT DOCUMENTS

| | | | | |
|---|---|---|---|---|
| JP | 2001-175326 A | | 6/2001 | |
| JP | 2001-292439 A | | 10/2001 | |
| JP | 2002-509268 A | | 3/2002 | |
| JP | 2002-152862 A | | 5/2002 | |
| JP | 2003-167623 A | | 6/2003 | |
| JP | 2003-526859 A | | 9/2003 | |
| JP | 2005-158070 A | | 6/2005 | |
| JP | 2006-229569 A | | 8/2006 | |
| JP | 2009-169888 A | | 7/2009 | |
| JP | 2010-19641 A | | 1/2010 | |
| JP | 2010-049584 A | | 3/2010 | |
| JP | 2010-148027 A | | 7/2010 | |
| JP | 2010-191641 A | | 9/2010 | |
| JP | 2011-034320 A | | 2/2011 | |
| JP | 2011034320 A | * | 2/2011 | G08B 31/00 |
| JP | 2016-076218 A | | 5/2016 | |
| JP | 2016-163242 A | | 9/2016 | |
| JP | 2016-208475 A | | 12/2016 | |
| JP | WO2015115137 A1 | * | 3/2017 | G01R 21/133 |
| JP | 2018-077779 A | | 5/2018 | |
| WO | 01/67623 A2 | | 9/2001 | |
| WO | WO-2010116599 A1 | * | 10/2010 | G05B 19/4184 |

OTHER PUBLICATIONS

Written Opinion dated Apr. 24, 2018, issued in counterpart Application No. PCT/JP2018/011836, with English translation. (12 pages).

* cited by examiner

MONITORING SYSTEM, PROCESSING DEVICE, AND MONITORING DEVICE

TECHNICAL FIELD

The present invention relates to a monitoring system, a processing device, a monitoring device, a monitoring method, and a program.

Priority is claimed on Japanese Patent Application No. 2017-059450, filed Mar. 24, 2017, the content which is incorporated herein by reference.

BACKGROUND ART

In a conventional technology, to monitor whether facilities are operating normally in various plants such as power plants and chemical plants and various facilities such as machinery, sensor data such as temperature and pressure is acquired as operating states and monitored. In remote monitoring and diagnosis systems, operating states of facilities to be monitored at sites and locations are detected through sensor data and this data is collected and integrated and transmitted to a data center (cloud) through communication (refer to Patent Literature 1, for example). In addition, after integration of data of a plurality of machines and facilities to be monitored, monitoring and diagnosis actions are performed.

CITATION LIST

Patent Literature

[Patent Literature 1]
Japanese Unexamined Patent Application, First Publication No. 2002-152862

SUMMARY OF INVENTION

Technical Problem

To perform more detailed diagnosis, it is necessary to increase a data amount of sensor data used for diagnosis (the number of sensors, data sampling rate increase, massive data such as vibrations, images, sounds, and the like). However, the technique disclosed in Patent Literature 1 has problems that all data is transmitted to a data center and thus a time and communication cost are required to transmit data when the amount of data increases. Furthermore, when massive data is transmitted, a network bandwidth is pressed.

According to each above-described embodiment, a monitoring system, a processing device, a monitoring device, a monitoring method and a program which can monitor facilities to be monitored in more detail while reducing the amount of data to be transmitted are provided.

Solution to Problem

According to a first aspect of the present invention, a monitoring system performs monitoring using a monitoring device connected to a facility to be monitored through the Internet via communication, wherein the facility to be monitored includes: a facility body; and a data processing unit configured to process acquired data acquired from the facility body, the data processing unit includes: a low-density data acquisition unit configured to acquire low-density data from among the acquired data; a high-density data acquisition unit configured to acquire high-density data having a larger data amount per unit time than the low-density data from among the acquired data; a data conversion unit configured to convert the high-density data into feature quantity data which is reduced in density of the high-density data; and a transmission unit configured to transmit monitoring data including the low-density data and the feature quantity data, and the monitoring device configured to perform monitoring on the basis of the monitoring data transmitted from the transmission unit in the data processing unit of the facility to be monitored.

The monitoring device may request detailed data from the facility to be monitored on the basis of the monitoring data, and the transmission unit may transmit detailed data including at least one of the high-density data and the low-density data or the feature quantity data when requested by the monitoring device.

The monitoring device may request the detailed data from the facility to be monitored when an abnormality degree of the facility body based on the low-density data or the feature quantity data is equal to or greater than a predetermined threshold value.

The high-density data has, for example, a sampling period of 100 Hz to 1 MHz or is moving image data having one million pixels and a frame rate of 30 or more.

According to a second aspect of the present invention, a processing device included in a facility to be monitored in a monitoring system performing monitoring using a monitoring device connected to the Internet through communication with the facility to be monitored includes a data processing unit configured to process acquired data acquired from a facility body, wherein the data processing unit includes: a low-density data acquisition unit configured to acquire low-density data from among the acquired data; a high-density data acquisition unit configured to acquire high-density data having a larger data amount per unit time than the low-density data from among the acquired data; a data conversion unit configured to convert the high-density data into feature quantity data which is reduced in density of the high-density data; and a transmission unit configured to transmit monitoring data including the low-density data and the feature quantity data.

According to a third aspect of the present invention, a monitoring device in a monitoring system performing monitoring using the monitoring device connected to the Internet through communication with a facility to be monitored is configured to receive monitoring data including low-density data from among acquired data acquired from a facility body and feature quantity data obtained which is reduced in density of high-density data having a larger data amount per unit time than the low-density data from among the acquired data and perform monitoring on the basis of the received monitoring data.

According to the aforementioned monitoring system, processing device and monitoring device, it is possible to monitor facilities to be monitored in more detail while reducing the amount of data to be transmitted.

DESCRIPTION OF EMBODIMENTS

Hereinafter, an embodiment of the present invention will be described, but the following embodiment does not limit the invention within the scope of the claims. In addition, not all of combinations of features described in the embodiment are necessary for solutions of the invention.

Figure 1:
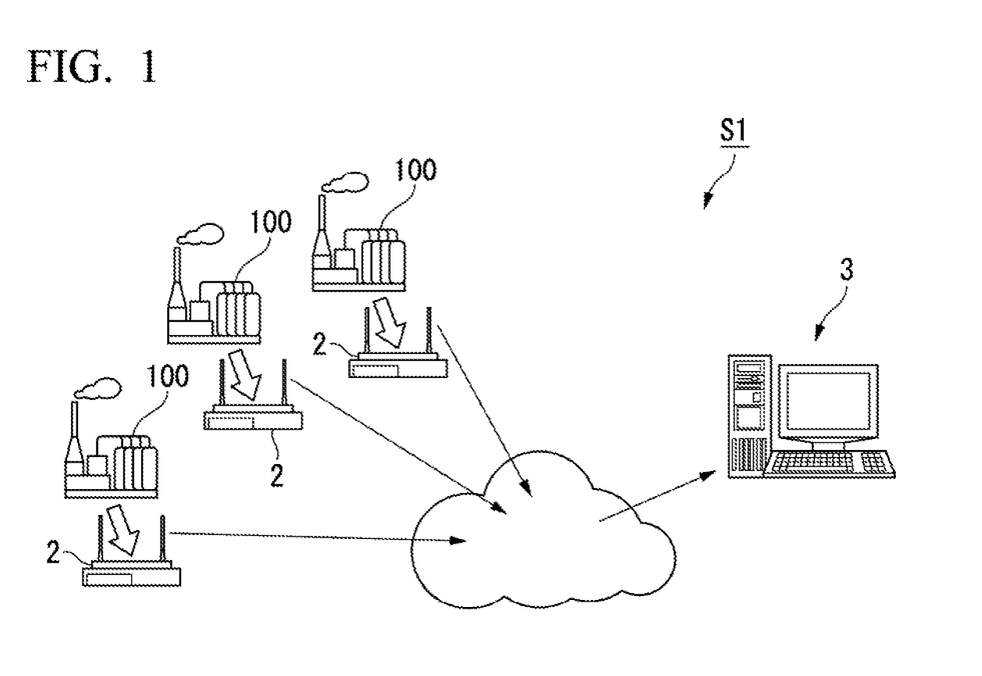
FIG. 1 is a schematic diagram of a monitoring system in an embodiment of the present invention.

FIG. 1 is a schematic diagram of a monitoring system S1 in an embodiment of the present invention. The monitoring system S1 is a system that monitors a state during operation of each plant 100 which is a facility to be monitored installed in each of a plurality of factories through a monitoring device 3 installed in a remote monitoring center at a remote location from the factories. The plant 100 includes a facility body and an edge device 2 that processes acquired data acquired from the facility body. Each edge device 2 is connected to the monitoring device 3 through a public communication network such as the Internet. When the plant 100 is a thermal power generation plant, for example, the facility body includes a plurality of facilities involved in thermal power generation and installed in the plant, such as a gas turbine, a compressor, a fuel gas supply facility, and an exhaust gas processing facility.

Figure 2:
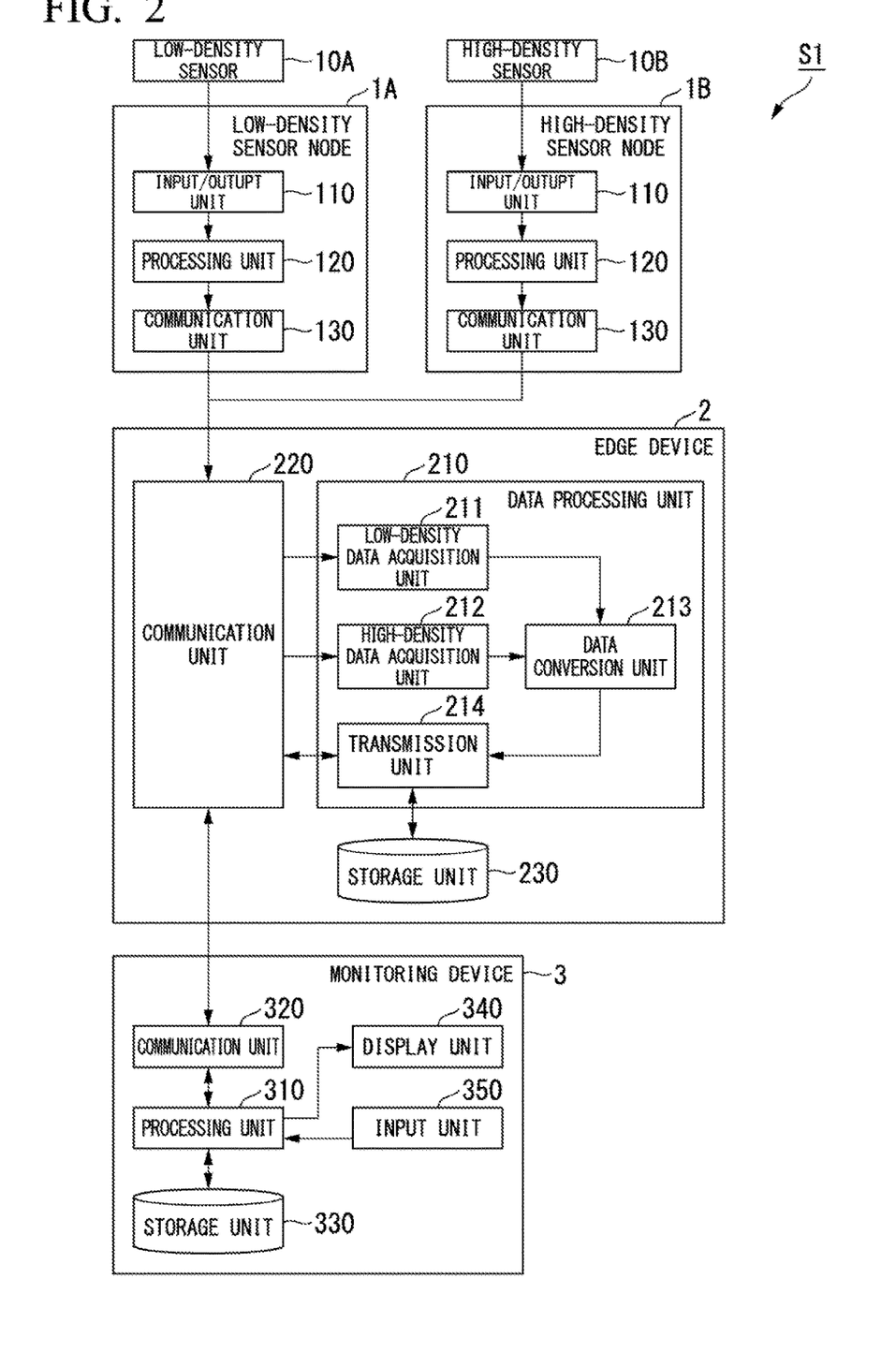
FIG. 2 is a schematic block diagram showing a functional configuration of the monitoring system in the same embodiment.

FIG. 2 is a schematic block diagram showing a functional configuration of the monitoring system S1. In the figure, the monitoring system S1 includes a low-density sensor 10A, a low-density sensor node 1A, a high-density sensor 10B, a high-density sensor node 1B, an edge device 2 (processing device), and the monitoring device 3. Hereinafter, the low-density sensor 10A and the high-density sensor 10B will be referred to as a sensor 10 when they are not distinguished from each other. In addition, the low-density sensor node 1A and the high-density sensor node 1B will be referred to as a sensor node 1 when they are not distinguished from each other.

Each plant 100 may include a plurality of sets of a combination of the low-density sensor 10A and the low-density sensor node 1A and a combination of the high-density sensor 10B and the high-density sensor node 1B.

The sensor 10, the sensor node 1 and the edge device 2 are installed in the plant 100. The sensor 10 and the sensor node 1 are connected through an input/output (I/O) unit. Each sensor node 1 and the edge device 2 communicate with each other through a local area network (LAN) or the like. Alternatively, an input of each sensor node 1 may be input to an I/O unit of the edge device as an electrical signal through direct connection. In addition, the monitoring device 3 and the edge device 2 communicate with each other through a public communication network such as the Internet.

The sensor 10 detects and acquires a state quantity of the plant 100 and outputs sensor data (acquired data) indicating the acquired state quantity to the sensor node 1. The low-density sensor 10A acquires a state quantity for which acquired data is low-density data. The low-density sensor 10A has, for example, a long sampling period in which a state quantity is detected (e.g., 0.1 seconds to 1 second). For example, the low-density sensor 10A is a sensor that detects the pressure, the temperature, the flow rate and the number of revolutions of the plant 100 or gas/oil analysis data.

The high-density sensor 10B acquires a state quantity for which acquired data is high-density data having a larger data amount per unit time than low-density data. For example, the high-density sensor 10B is a sensor that has a short sampling period in which a state quantity is detected (e.g., 100 Hz to 1 MHz) and detects vibration of a compressor or the like, acoustic emission (AE), and the like. For example, it is possible to diagnose damage of a compressor or the like by using a vibration sensor that detects vibration. To this end, however, data of about ten times the number of revolutions (e.g., 6000 revolutions per minute (RPM)) of the compressor or the like is necessary. Accordingly, a sampling period of the vibration sensor is $10^2$ to $10^5$ Hz and a data size is 200 B (bytes) to 200 kB. In addition, a sampling period of an AE sensor that detects AE is $10^3$ to $10^6$ Hz and a data size is 2 kB to 2 MB. Alternatively, the high-density sensor 10B may be a sensor that detects an image, sound or the like having a large data amount per 1 sampling. The size of image data generated by an image sensor that captures an image is, for example, 800×600×24 bits=1.4 MB.

The sensor node 1 transmits sensor data acquired by the sensor 10 to the edge device 2. The sensor node 1 includes an input/output unit 110, a processing unit 120 and a communication unit 130. The input/output unit 110 performs data input/output with the sensor 10. The processing unit 120 transmits sensor data input from the sensor 10 to the input/output unit 110 from the communication unit 130 to the edge device 2. The communication unit 130 communicates with the edge device 2.

The low-density sensor node 1A acquires low-density data from the low-density sensor 10A and transmits the low-density data to the edge device 2. The high-density sensor node 1B acquires high-density data from the high-density sensor 10B and transmits the high-density data to the edge device 2.

The edge device 2 is a computer positioned on a network of the plant 100 and may have a function of a router or an Internet gateway. The edge device 2 includes a data processing unit 210, a communication unit 220 and a storage unit 230. The data processing unit 210 is configured as a combination of a central processing unit (CPU) and a memory and generally controls the edge device 2. The data processing unit 210 includes a low-density data acquisition unit 211, a high-density data acquisition unit 212, a data conversion unit 213 and a transmission unit 214 and processes acquired data acquired from the facility body.

The low-density data acquisition unit 211 receives and acquires low-density data from the low-density sensor node 1A through the communication unit 220 and outputs the acquired low-density data to the data conversion unit 213. The high-density data acquisition unit 212 receives and acquires high-density data from the high-density sensor node 1B through the communication unit 220 and outputs the acquired high-density data to the data conversion unit 213.

The data conversion unit 213 converts high-density data acquired from the high-density data acquisition unit 212 into feature quantity data which is reduced in density of the high-density data. Reducing a density is a process of decreasing a data amount per unit time. In the present embodiment, the density is reduced to the same degree as low-density data, and for example, a process is performed such that a sampling interval is adjusted to low-density data. In addition, the data conversion unit 213 diagnoses an abnormality of the plant 100 on the basis of the low-density data acquired by the low-density data acquisition unit 211 and the converted feature quantity data and outputs abnormality diagnostic result data indicating a diagnostic result, the low-density data and the feature quantity data to the transmission unit 214. The process in the data conversion unit 213 will be described in detail later.

The transmission unit 214 transmits monitoring data including the abnormality diagnostic result data, the low-density data and the feature quantity data to the monitoring device 3 through the communication unit 220. Further, the transmission unit 214 transmits detailed data including at least one of the high-density data, the low-density data and the feature quantity data to the monitoring device 3 when requested by the monitoring device 3.

The communication unit 220 communicates with the sensor node 1 or the monitoring device 3. The storage unit 230 stores various types of information. For example, the storage unit 230 serves as a time-series raw waveform database that stores raw waveform data of low-density data and high-density data. In addition, the storage unit 230 serves as a time-series feature quantity database that stores time-series feature quantity data. Further, the storage unit 230 stores abnormality diagnostic result data. The storage unit 230 serves as a short-term history database that stores a history in a short period and stores data (low-density data, high-density data, feature quantity data and abnormality diagnostic result data) for a short period (e.g., the past month). Further, the storage unit 230 stores sensor data when each sensor 10 is normal (hereinafter referred to as normal data) used to diagnose an abnormality.

The monitoring device 3 is a computer installed in a remote monitoring center and includes a processing unit 310, a communication unit 320, a storage unit 330, a display unit 340 and an input unit 350. The processing unit 310 is configured as a combination of a CPU and a memory and generally controls the entire monitoring device 3. For example, the processing unit 310 displays monitoring data received from the edge device 2 through the communication unit 320 on the display unit 340 and monitors the monitoring data. In addition, the processing unit 310 requests detailed data from the edge device 2 on the basis of the monitoring data.

The communication unit 320 communicates with the edge device 2. The storage unit 330 stores various types of information. For example, the storage unit 330 stores monitoring data received from the edge device 2. The storage unit 330 serves as a long-term history database that stores a history over a long period and stores monitoring data for a long period (e.g., past several years). The display unit 340 is a liquid crystal display (LCD), an organic electro-luminescence (EL) display, or the like and displays various types of information. The input unit 350 is a mouse, a keyboard, a touch panel, or the like and receives an input.

Next, operation in the monitoring system S1 according to the present embodiment will be described. In the monitoring system S1, the edge device 2 transmits monitoring data based on sensor data acquired from the sensor node 1 to the monitoring device 3. The monitoring device 3 monitors the plant 100 by displaying the monitoring data received from the edge device 2, or the like.

Figure 3:
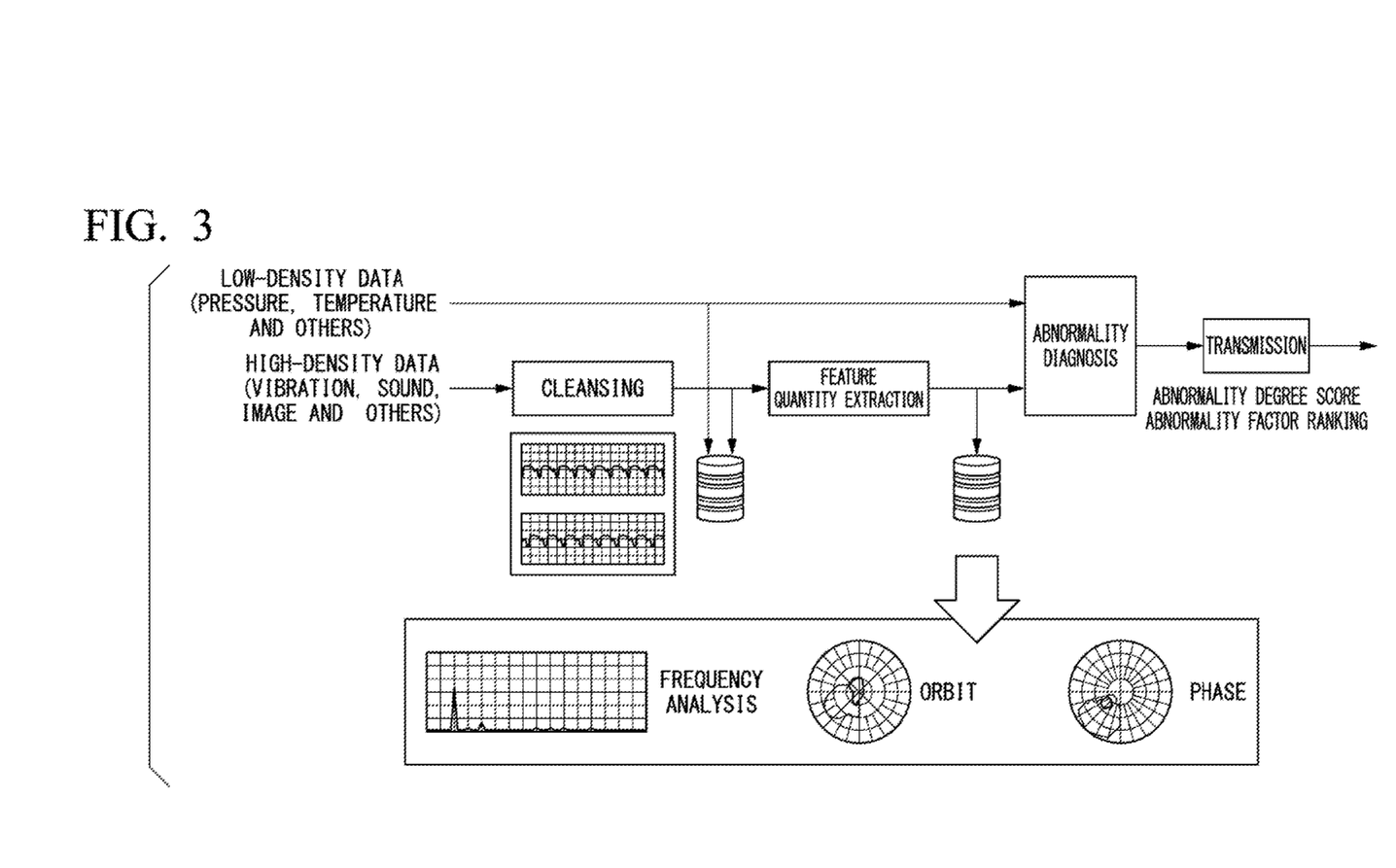
FIG. 3 is a diagram for describing a process performed by an edge device in the same embodiment.

FIG. 3 is a diagram for describing a process performed by the edge device 2. First, the low-density data acquisition unit 211 acquires low-density data from the low-density sensor node 1A through the communication unit 220 and writes and stores the acquired low-density data in the storage unit 230. In addition, the high-density data acquisition unit 212 acquires high-density data from the high-density sensor node 1B through the communication unit 220.

Subsequently, the data conversion unit 213 cleanses the high-density data. Specifically, when data is missed and thus there is a "not available (N/A)" data part, for example, the data conversion unit 213 sets the missed part as the average of data before and after the missed part. In addition, when a plurality of pieces of data are duplicately input at the same time, the data conversion unit 213 employs the first data. Further, when data has become an abnormal value (a maximum value or a minimum value (value 0) due to noise of the sensor 10, the data conversion unit 213 sets the data that has become an abnormal value as the average of data before and after the data. In addition, the data conversion unit 213 writes and stores the cleansed high-density data in the storage unit 230. Further, the data conversion unit 213 may also perform a process of cleansing low-density data.

Subsequently, the data conversion unit 213 extracts a feature quantity from the cleansed high-density data and converts the feature quantity into feature quantity data in which a sampling interval of the high-density data has been adjusted to a sampling interval of the low-density data. It is possible to set a diagnostic frequency of the high-density data to that of the low-density data by adjusting the sampling interval of the high-density data to the sampling interval of the low-density data. For example, the data conversion unit 213 reads continuous data, performs frequency analysis according to a fast Fourier transform (FFT) and executes frequency analysis for extracting an amplitude for each frequency range. In addition, when sensor data is the number of revolutions, the data conversion unit 213 executes revolution number component analysis for extracting a gain or a phase of a frequency component of one times, two times, . . . or 0.5 times the number of revolutions. Further, when sensor data is vibration, the data conversion unit 213 executes axial center position analysis for calculating a center position of an axis from the average of displacements of two vibration sensors installed at 90 degrees. Then, the data conversion unit 213 extracts a peak value for each band which is obtained from analysis results (data of frequency analysis, a Nyquist diagram, a Bode diagram, and the like) as a feature quantity and writes and stores the feature quantity in the storage unit 230 as feature quantity data.

Then, the data conversion unit 213 diagnoses an abnormality on the basis of the low-density data and the feature quantity data. Specifically, first, the data conversion unit 213 analyzes data according to a time-series data analysis technique. For example, the data conversion unit 213 sets a threshold value in each sensor 10, regards data as an abnormality when the data exceeds the threshold value, and calculates an abnormality degree according to threshold value management for increasing an abnormality degree in response to a quantity that has exceeded the threshold value. Alternatively, the data conversion unit 213 determines coordinates of a reference point in a multidimensional space on the basis of normal data, calculates the coordinates and coordinates of each piece of data as a Mahalanobis distance and calculates an abnormality degree according to a Mahalanobis-Taguchi (MT) method in which an abnormality degree increases as the distance increases. Alternatively, the data conversion unit 213 calculates an abnormality degree according to a K-nearest neighbors algorithm in which a point is determined as an abnormal value when a distance from certain data to other nearest data (a nearest point) exceeds a certain threshold value, the point as an abnormal value. The data conversion unit 213 may write and store data after analysis in the storage unit 230 as feature quantity data.

Then, the data conversion unit 213 determines that there is no abnormality when the calculated abnormality degree is equal to or less than a predetermined threshold value α set in advance. In addition, the data conversion unit 213 determines that there is an abnormality and analyzes the cause of the abnormality when the abnormality degree is greater than the threshold value α. For example, the data conversion unit 213 represents various experience values represented by an expert system in the form of "If Then" and analyzes the cause of the abnormality based on a rule for diagnosing a cause of an abnormality. Alternatively, the data conversion unit 213 analyzes the cause of the abnormality according to an MT method in which data is allocated to an orthogonal table, SN ratios (in units of decibels (dB)) of larger-is-better characteristics are calculated and a result with a high SN ratio is selected as an item related to a cause of an abnormality. Alternatively, the data conversion unit 213 analyzes the cause of the abnormality according to a Failure Mode and Effect Analysis (FMEA) by which sensor data extracted as a cause of a failure is referred to as a failure mode of FMEA created for target machines in advance to extract the cause of the failure.

Figure 4:
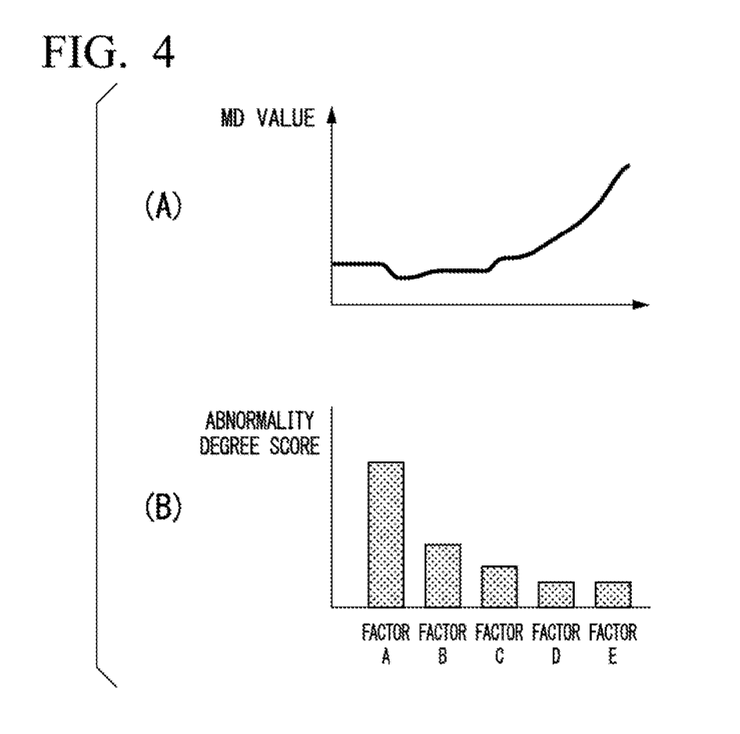
FIG. 4 is a diagram showing an example of abnormality diagnostic result data generated by the edge device in the same embodiment.

Then, the data conversion unit 213 generates abnormality diagnostic result data. FIG. 4 is a diagram showing an example of the abnormality diagnostic result data generated by the edge device 2. FIG. 4(A) is a graph showing an MD (Mahalanobis distance) value that is a calculation result according to the MT method. The horizontal axis of the graph shown in this figure represents time and the vertical axis represents the MD value. In addition, FIG. 4(B) shows an abnormality degree score and abnormality factor ranking of each factor (cause of abnormality). The abnormality factor ranking is ranking of a factor with a high abnormality degree score. In the illustrated example, the abnormality degree score is higher in the order of factor A, factor B, factor C, factor D and factor E and the abnormality factor ranking is in this order.

Thereafter, the transmission unit 214 transmits monitoring data including the abnormality diagnostic result data, the low-density data and the feature quantity data to the monitoring device 3 through the communication unit 220. The monitoring device 3 monitors the plant 100 by displaying the received monitoring data (e.g., a graph showing MD values, abnormality degree scores, abnormality factor ranking and the like) or the like.

In addition, the monitoring device 3 outputs a warning (alarm) and requests more detailed data from the edge device 2 when an abnormality degree score is high (greater than a predetermined threshold value β set in advance). Here, the threshold value β compared with the abnormality degree score by the monitoring device 3 may be a value different from the threshold value α compared in the edge device 2. Specifically, the processing unit 310 transmits a detailed data request for requesting detailed data to the edge device 2 through the communication unit 320. The detailed data includes at least one of low-density data, high-density data and feature quantity data. The detailed data request includes a data type (type of a state quantity detected by the sensor 10), a period in which data is acquired, and a data format (raw waveform data (low-density data or high-density data), feature quantity data, or the like).

When the edge device 2 receives the detailed data request from the monitoring device 3, the edge device 2 returns detailed data consistent with the received detailed data request to the monitoring device 3. Specifically, when the transmission unit 214 receives the detailed data request from the monitoring device 3 through the communication unit 220, the transmission unit 214 searches the storage unit 230 for data consistent with the data type, period and data format included in the received detailed data. Then, the transmission unit 214 transmits detailed data that is a search result to the monitoring device 3 through the communication unit 220.

When the processing unit 310 of the monitoring device 3 receives the detailed data from the edge device 2, the processing unit 310 displays the received detailed data on the display unit 340. Accordingly, a detailed operation situation of the plant 100 with a high abnormality degree can be checked in the monitoring device 3. In addition, the processing unit 310 may diagnose an abnormality on the basis of the received detailed data. The method of diagnosing an abnormality in the processing unit 310 may differ from the method of diagnosing an abnormality in the edge device 2.

Figure 5:
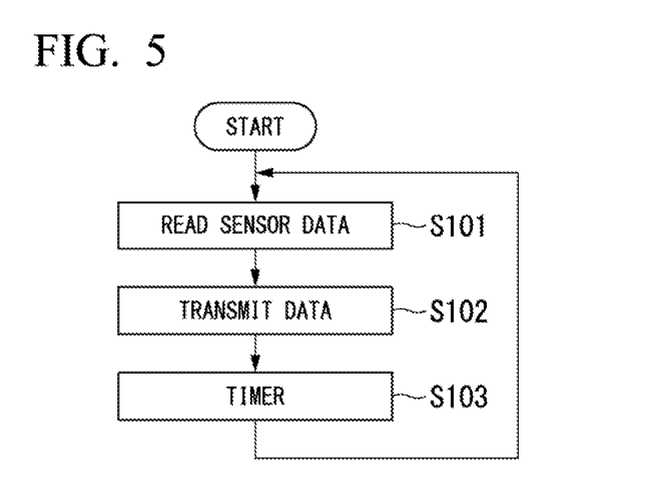
FIG. 5 is a flowchart showing an example of a processing procedure through which a sensor node in the same embodiment acquires sensor data.

FIG. 5 is a flowchart showing an example of a processing procedure in which the sensor node 1 acquires sensor data.

First, the processing unit 120 reads sensor data from the sensor 10 (step S101). Then, the processing unit 120 transmits the read sensor data from the communication unit 130 to the edge device 2 (step S102). Thereafter, the processing unit 120 waits for a time of a timer of a sampling period in which sensor data is read (step S103) and then returns to the process of S101.

Figure 6:
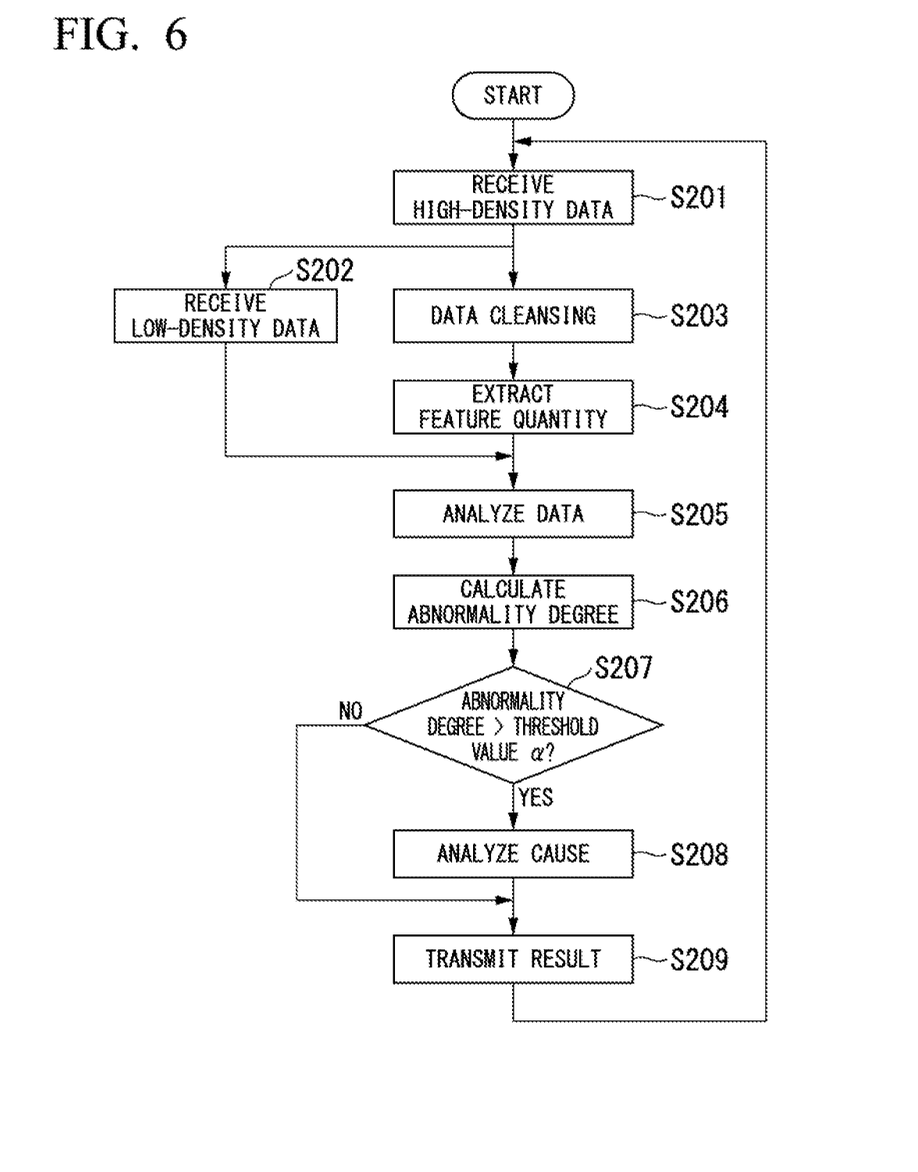
FIG. 6 is a flowchart showing an example of a processing procedure through which the edge device in the same embodiment transmits monitoring data.

FIG. 6 is a flowchart showing an example of a processing procedure in which the edge device 2 transmits monitoring data.

First, the high-density data acquisition unit 212 receives high-density data from the high-density sensor node 1B through the communication unit 220 (step S201). In addition, the low-density data acquisition unit 211 receives low-density data from the low-density sensor node 1A through the communication unit 220 (step S202).

Subsequently, the data conversion unit 213 cleanses the high-density data (step S203). Thereafter, the data conversion unit 213 extracts a feature quantity of the cleansed high-density data to generate feature quantity data (step S204).

Subsequently, the data conversion unit 213 analyzes the feature quantity data and the low-density data (step S205). Subsequently, the data conversion unit 213 calculates an abnormality degree (step S206). Then, the data conversion unit 213 determines whether the calculated abnormality degree is greater than the threshold value α (step S207).

When it is determined that the abnormality degree is greater than the threshold value α (step S207: YES), the data conversion unit 213 analyzes the cause of an abnormality (step S208).

On the other hand, when it is determined that the abnormality degree is equal to or less than the threshold value α (step S207: NO) or subsequently to step S208, the transmission unit 214 transmits monitoring data including abnormality diagnostic result data acquired by the data conversion unit 213 to the monitoring device 3 through the communication unit 220 (step S209) and returns to the process a step S201.

Figure 7:
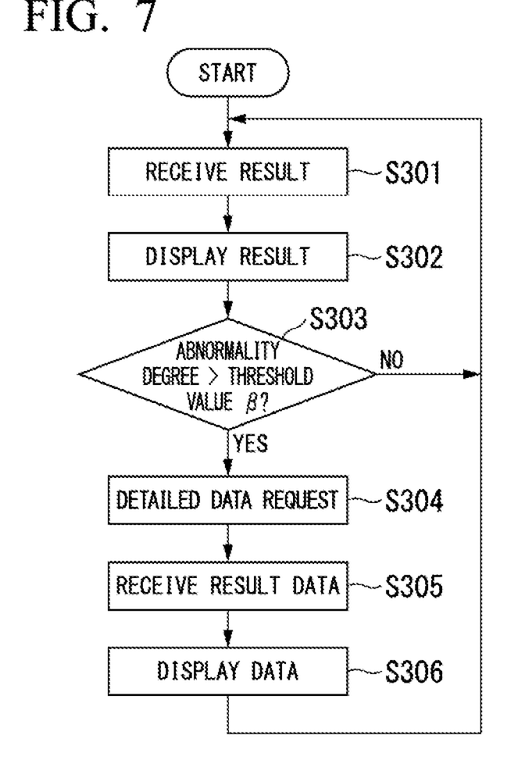
FIG. 7 is a flowchart showing an example of a processing procedure through which a monitoring device in the same embodiment performs monitoring.

FIG. 7 is a flowchart showing an example of a processing procedure in which the monitoring device 3 performs monitoring.

First, the processing unit 310 receives monitoring data including abnormality diagnostic result data from the edge device 2 through the communication unit 320 (step S301). Subsequently, the processing unit 310 displays the received abnormality diagnostic result data on the display unit 340 (step S302).

Subsequently, the processing unit 310 determines whether an abnormality degree included in the received abnormality diagnostic result data is greater than the threshold value β (step S303). The processing unit 310 returns to the process of step S301 when it is determined that the abnormality degree is equal to or less than the threshold value β (step S303: NO).

On the other hand, when it is determined that the abnormality degree is greater than the threshold value β (step S303: YES), the processing unit 310 transmits a detailed data request to the edge device 2 through the communication unit 320 (step S304). Thereafter, the processing unit 310 receives detailed data through the communication unit 320 (step S305). Then, the processing unit 310 displays the received detailed data on the display unit 340 (step S306) and returns to the process of step S301.

Figure 8:
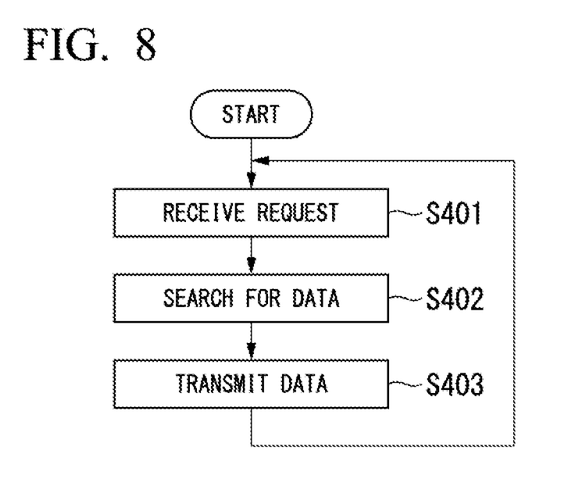
FIG. 8 is a flowchart showing an example of a processing procedure through which the edge device in the same embodiment transmits detailed data.

FIG. 8 is a flowchart showing an example of a processing procedure in which the edge device 2 transmits detailed data.

First, the transmission unit 214 receives a detailed data request from the monitoring device 3 through the communication unit 220 (S401). Subsequently, the transmission unit 214 searches the storage unit 230 for data consistent with the detailed data request (step S402). Subsequently, the transmission unit 214 transmits the searched detailed data to the monitoring device 3 through the communication unit 220 (step S403) and returns to the process of step S401.

As described above, the monitoring system S1 monitors the plant 100 through the monitoring device 3 connected to the plant 100 through a network. The plant 100 includes the facility body and the data processing unit 210 which processes acquired data acquired from the facility body. The data processing unit 210 includes the low-density data acquisition unit 211 which acquires low-density data from among the acquired data, the high-density data acquisition unit 212 which acquires high-density data having a larger data amount per unit time than the low-density data from among the acquired data, the data conversion unit 213 which converts the high-density data into feature quantity data which is reduced in density of the high-density data, and the transmission unit 214 which transmits monitoring data including the low-density data and the feature quantity data. The monitoring device 3 performs monitoring on the basis of the monitoring data transmitted from the transmission unit 214 in the data processing unit 210.

In this manner, since the feature quantity data obtained which is reduced in density of the high-density data is transmitted to the monitoring device 3, the amount of data to be transmitted to the monitoring device 3 can be reduced. Accordingly, it is possible to decrease a data transfer time, reduce communication cost and mitigate pressing of a network bandwidth. Further, although a security threat of data stealing increases due to a data transfer amount, it is possible to increase confidentiality of data and reducing a stealing risk by decreasing a data amount. In addition, although data correction or recovery should be performed when a damage or delay of data has occurred due to data transfer, it is possible to reduce a damage or delay of data by decreasing a data amount. Further, although a compliance risk such as a regulation of imports and exports is involved when the plant 100 and the monitoring device 3 are present in different countries and cross-border long-distance data transfer is performed, such a risk can be reduced by decreasing a data amount and converting the decreased data amount into a different state quantity.

In addition, it is possible to perform detailed diagnosis because an abnormality of the plant 100 can be diagnosed using feature quantity data which is reduced in density of high-density data. Accordingly, it is possible to monitor a plant in more detail while reducing the amount of data transmitted to the monitoring device 3.

Further, the monitoring device 3 requests detailed data when an abnormality degree of the plant 100 based on the low-density data or the feature quantity data is equal to or greater than a predetermined threshold value, and the transmission unit 214 transmits detailed data including at least one of the high-density data, the low-density data and the feature quantity data when requested from the monitoring device 3. Accordingly, it is possible to check a more detailed operating situation of the plant 100 when an abnormality has occurred through the monitoring device 3 because more detailed information can be acquired when an abnormality degree is high.

In addition, the high-density data has, for example, a sampling period of 100 Hz to 1 MHz. Accordingly, it is possible to perform more detailed diagnosis because diagnosis can be performed using data having a short sampling period and a larger data amount per unit time.

Further, all or some functions of the data processing unit 210 of the edge device 2 or the processing unit 310 of the monitoring device 3 in the above-described embodiment may be realized by recording a program for realizing such functions on a computer-readable recording medium and causing a computer system to read and execute the program recorded on the recording medium. Here, the "computer system" may include an OS and hardware such as peripheral apparatuses.

In addition, if a WWW system is used, it is assumed that the "computer system" includes a home-page providing environment (or a display environment). Further, the "computer-readable recording medium" refers to a portable medium such as a flexible disk, a magneto-optic disk, a ROM or a CD-ROM, a storage such as a hard disk embedded in a computer system, or the like. Further, the "computer-readable recording medium" may also include a medium which dynamically stores a program for a short time, such as a communication line when a program is transmitted through a network such as the Internet or a communication circuit such as a telephone circuit, or a medium which stores a program for a specific time, such as a volatile memory in a computer system which is a server or a client in that case. In addition, the aforementioned program may be for realizing some of the above-described functions and may be realized by combining the above-described functions with a program that has already been recorded in a computer system.

Although embodiments of the present invention have been described in detail with reference to the drawings, a specific configuration is not limited to these embodiments and also includes design change and the like in ranges without departing from the scope and spirit of the invention.

For example, although the edge device 2 diagnoses an abnormality of the plant 100 in the above-described embodiment, the present invention is not limited thereto, and the edge device 2 may transmit only the low-density data and feature quantity data and the monitoring device 3 may diagnose an abnormality of the plant 100 on the basis of the low-density data and the feature quantity data. Here, the feature quantity data transmitted by the edge device 2 may be data after data analysis in aforementioned step S205 or data after feature quantity extraction in aforementioned step S204.

In addition, although a case in which the edge device 2 is a router has been described as an example in the above-described embodiment, the present invention is not limited thereto, and a device connected to a LAN of the plant 100 may include the function of the data processing unit 210 of the edge device 2 and, for example, the function may be installed in the body of the plant 100 or included in a computer in a factory.

Further, although the monitoring device 3 automatically requests detailed data from the edge device 2 when an abnormality degree score is high in the above-described embodiment, the present invention is not limited thereto and a warning (alarm) may be simply output. In this case, a user of the monitoring device 3 manually inputs an operation for requesting detailed data to the input unit 350 in response to the warning. When the input unit 350 has received the input of the operation for requesting the detailed data, the processing unit 310 of the monitoring device 3 transmits the detailed data request to the edge device 2 through the communication unit 320. In that case, the user may designate a data type, a period in which data is acquired, a data format, and the like included in the detailed data request.

Further, although a case in which the monitoring device 3 includes the long-term history database has been described in the above-described embodiment, the present invention is not limited thereto and a device separate from the monitoring device 3, for example, a data server or the like in a data center (cloud) or the like may include the long-term history database. In this case, the data center collects monitoring data of each plant 100 from each edge device 2 and accumulates the collected monitoring data in the long-term history database. Then, the monitoring device 3 acquires monitoring data from the data center.

Further, although the edge device 2 integrates low-density data and feature quantity data and transmits the integrated data as monitoring data in the above-described embodiment, the present invention is not limited thereto and the low-density data and the feature quantity data may be separately transmitted. For example, low-density data may be sequentially transmitted and the high-density data may be transmitted every time generated as feature quantity data as each piece of data constituting monitoring data.

In addition, the method of cleansing data and the method of extracting a feature quantity are not limited to those of the above-described embodiment and any other methods may be used if they can reduce the density of high-density data.

In addition, the method of diagnosing an abnormality is not limited to the method of the above-described embodiment and any other methods may be used if they can diagnose an abnormality of the plant 100. Further, although the plant 100 composed of a plurality of machines and the like has been described as a facility to be monitored in the above-described embodiment, the present invention is not limited thereto. For example, a single machinery installed in a factory or a whole facility such as a building itself can be applied as an object to be monitored.

Acquired data about the plant 100 acquired by the sensor 10 is, for example, data about vibration of the plant 100, data about sound, data about images, and the like. Low-density data and feature quantity data are generated on the basis of such acquired data. The edge device 2 or the monitoring device 3 calculates an abnormality degree and performs cause analysis on the basis of the generated low-density data and feature quantity data.

Even in the case of acquired data of a large size such as data about vibration, the monitoring device 3 as well as the edge device 2 can perform appropriate calculation of an abnormality degree, or the like by reducing the density of the data.

Here, the feature quantity data may be an average value, a variance value, a maximum value, a minimum value, and the like as frequency analysis results of acquired data (data about vibration, data about sound, and data about an image) in a predetermined period.

In addition to measuring a temperature, a pressure, a flow rate and the like at any timing in a predetermined period and setting the average, instantaneous value or the like of measurement results as low-density data, measurement may be performed at a higher period in the predetermined period to generate high-density data and a maximum value, a variance value, a minimum value and the like in such high-density data may be set to a feature quantity. Accordingly, it is possible to perform advanced calculation of abnormality degrees and cause analysis through the edge device 2 and the like.

The edge device 2 may perform calculation of an abnormality degree, cause analysis and the like and notify the monitoring device 3 of an abnormality diagnosis result. In this case, since it is not necessary to transmit low-density data, feature quantity data and the like from the edge device 2 to the monitoring device 3, the abnormality diagnosis result can be rapidly notified of without being affected by a communication environment between the edge device 2 and the monitoring device 3. The monitoring device 3 can detect an abnormality in early stages and consider an appropriate countermeasure by employing the aforementioned configuration.

INDUSTRIAL APPLICABILITY

A monitoring system, a processing device, a monitoring device, a monitoring method and a program which can monitor facilities to be monitored in more detail while reducing the amount of data to be transmitted are provided.

REFERENCE SIGNS LIST

S1 Monitoring system
1 Sensor node
2 Edge device
3 Monitoring device
10 Sensor
100 Plant (facility to be monitored)
110 Input/output unit
120 Processing unit
130 Communication unit
210 Data processing unit
211 Low-density data acquisition unit
212 High-density data acquisition unit
213 Data conversion unit
214 Transmission unit
220 Communication unit
230 Storage unit
310 Processing unit
320 Communication unit
330 Storage unit
340 Display unit
350 Input unit

The invention claimed is:

1. A monitoring system performing monitoring using a monitoring device connected to a facility to be monitored through the Internet via communication,
wherein the facility to be monitored comprises:
a facility body which is an apparatus installed in the facility or which is an apparatus which configures the facility; and
a CPU configured to process acquired data acquired from the facility body,
wherein the CPU is further configured to:
acquire low-density data from among the acquired data, the low-density data being first state quantity acquired at a first sampling interval;
acquire high-density data among the acquired data, the high-density data being second state quantity which is acquired at a second sampling interval shorter than the first sampling interval or in which a data amount of the second state quantity acquired per a sampling is larger than the first state quantity;
convert the high-density data into feature quantity data which includes feature quantity indicating a representing value extracted from the high-density data acquired within the first sampling interval so that a sampling interval of the feature quantity is adjusted to be same as the first sampling interval; and
transmit monitoring data including the low-density data and the feature quantity data, and
wherein the monitoring device is configured to perform monitoring on the basis of the monitoring data transmitted from a transmission unit in a data processing unit of the facility to be monitored.

2. The monitoring system according to claim 1,
wherein the monitoring device is configured to request detailed data from the facility to be monitored on the basis of the monitoring data, and
wherein the CPU is configured to transmit detailed data including at least one of the high-density data and the low-density data or the feature quantity data when requested by the monitoring device.

3. The monitoring system according to claim 2, wherein the monitoring device is configured to request the detailed data from the facility to be monitored when an abnormality degree of the facility body based on the low-density data or the feature quantity data is equal to or greater than a predetermined threshold value, the abnormality degree being calculated based on an amount in which the low-density data or the feature quantity exceeds the predetermined threshold value or based on a distance from a criteria data to the low-density data or the feature quantity.

4. The monitoring system according to claim 1, wherein the high-density data has a sampling period of 100 Hz to 1 MHz.

5. A processing device included in a facility to be monitored in a monitoring system performing monitoring using a monitoring device connected to the facility to be monitored through the Internet, the processing device comprises a CPU configured to process acquired data acquired from a facility body which is an apparatus installed in the facility or which is an apparatus which configures the facility,
wherein the CPU is further configured to:
acquire low-density data from among the acquired data, the low-density data being first state quantity acquired at a first sampling interval;
acquire high-density data having a larger data amount per unit time than the low-density data from among the acquired data, the high-density data being second state quantity which is acquired at a second sampling interval shorter than the first sampling interval or in which a data amount of the second state quantity acquired per a sampling is larger than the first state quantity;
convert the high-density data into feature quantity data which includes feature quantity indicating a representing value extracted from the high-density data acquired within the first sampling interval so that a sampling interval of the feature quantity is adjusted to be same as the first sampling interval; and
transmit monitoring data including the low-density data and the feature quantity data.

6. A monitoring device in a monitoring system performing monitoring using the monitoring device connected to a facility to be monitored through the Internet, the monitoring device configured to:
receive monitoring data including:
low-density data from among acquired data acquired from a facility body which is an apparatus installed in the facility or which is an apparatus which configures the facility, the low-density data being first state quantity acquired at a first sampling interval; and
feature quantity data obtained which includes feature quantity indicating a representing value extracted from high-density data acquired within the first sampling interval so that a sampling interval of the feature quantity is adjusted to be same as the first sampling interval, the high-density data being second state quantity which is acquired at a second sampling interval shorter than the first sampling interval or in which a data amount of the second state quantity acquired per a sampling is larger than the first state quantity; and
perform monitoring on the basis of the received monitoring data.

* * * * *